UNITED STATES PATENT OFFICE.

EDWIN R. CLEVELAND, OF UNIONVILLE, OHIO.

CONDENSED CIDER COMPOUND.

SPECIFICATION forming part of Letters Patent No. 233,728, dated October 26, 1880.

Application filed May 14, 1880. (No specimens.)

*To all whom it may concern:*

Be it known that I, EDWIN R. CLEVELAND, of Unionville, in the county of Lake and State of Ohio, have invented a new and useful Improvement in Compound Cider-Sirups; and I do hereby declare that the following is a full and exact description of the same.

My invention relates to certain improvements in a condensed or concentrated cider, having as its special object the preparation of a semi-fluid substance which, when mixed with a suitable quantity of water, will form a grateful and refreshing drink.

In the usual form of concentrated apple-juice or cider the cider is boiled or otherwise evaporated until it forms, upon cooling, a solid jelly, which can be kept in boxes or bottles, pails, &c., until desirable to use, when it is formed into a beverage by the proper quantity being dissolved in water. When the juice has been reduced to the consistency of jelly it is much more difficult to dissolve in water than when in a less concentrated state; but the difficulty hitherto encountered has been in the danger of fermentation and consequent spoiling of the jellified substance, unless it is reduced in the proportion of one-seventh of its bulk in cider.

My intention is to so combine certain well-known healthful ingredients with concentrated cider that it can, with reasonable care, be kept in any climate and at any season.

To produce my compound cider-sirup I reduce sweet apple-juice or fresh cider by evaporation with steam-coils in pans to the proportion of about one gallon of sirup from seven gallons of juice, when I add about one ounce each of aromatic sulphuric acid and salicylic acid to the resulting sirup and thoroughly mix these ingredients together. After cooling the result will be a semi-fluid jellified substance, which can then be put in suitable jars, pails, or packages for transportation. This substance combines all the qualities of other cider-jelly with the advantage of being much less solid in its consistency, and therefore more readily dissolved in water.

The acids, which I use in about the proportions named, are admirable assistants to digestion and valuable as febrifuges in feverish conditions of the system, thus rendering the compound peculiarly adapted to use in warm climates and during the summer months in warm northern latitudes.

The benefit derived from the use of the pleasant beverage which results in mixing a small proportion of this compound in water will be felt by dyspeptic persons, and all who are subject to indigestion and the evils always attendant upon a disordered condition of the digestive organs.

These acids, when mixed in about the proportions named, are entirely harmless in their action upon the stomach and intestines, and are prescribed by physicians in all disorders, as enumerated above. My object is to form a compound which will keep in any climate, and at the same time be readily transformed into a healthful and refreshing beverage.

To make a sparkling cider of my sirup I take about five gallons of warm water and add one gallon of the compound until thoroughly dissolved and mixed. Then to the liquid add twenty pounds of merchantable refined sugar and twelve ounces of tartaric acid. These are all added to twenty gallons of pure drinking-water. This is then allowed to stand for a period of twenty-four hours, when it will be clear and ready to draw off into bottles; or it may be permitted to stand two or three days to start a ferment, when it will produce a fine clear sparkling cider. The proportions named are not absolute, but are as near as will obtain the best result.

Having thus described my invention, what I claim as new, and desire to secure by Letters Patent, is—

The within-described compound, as for the purpose set forth, consisting of concentrated cider or apple-juice and salicylic and aromatic sulphuric acids, prepared in about the proportions described.

This specification signed and witnessed this 14th day of April, 1880.

EDWIN R. CLEVELAND.

Witnesses:
GEO. C. TRACY,
S. M. WOLCOTT, Jr.